(No Model.) 3 Sheets—Sheet 2.
G. W. FERRER.
COMBINED SEED PLANTER AND FERTILIZER DISTRIBUTER.
No. 416,291. Patented Dec. 3, 1889.
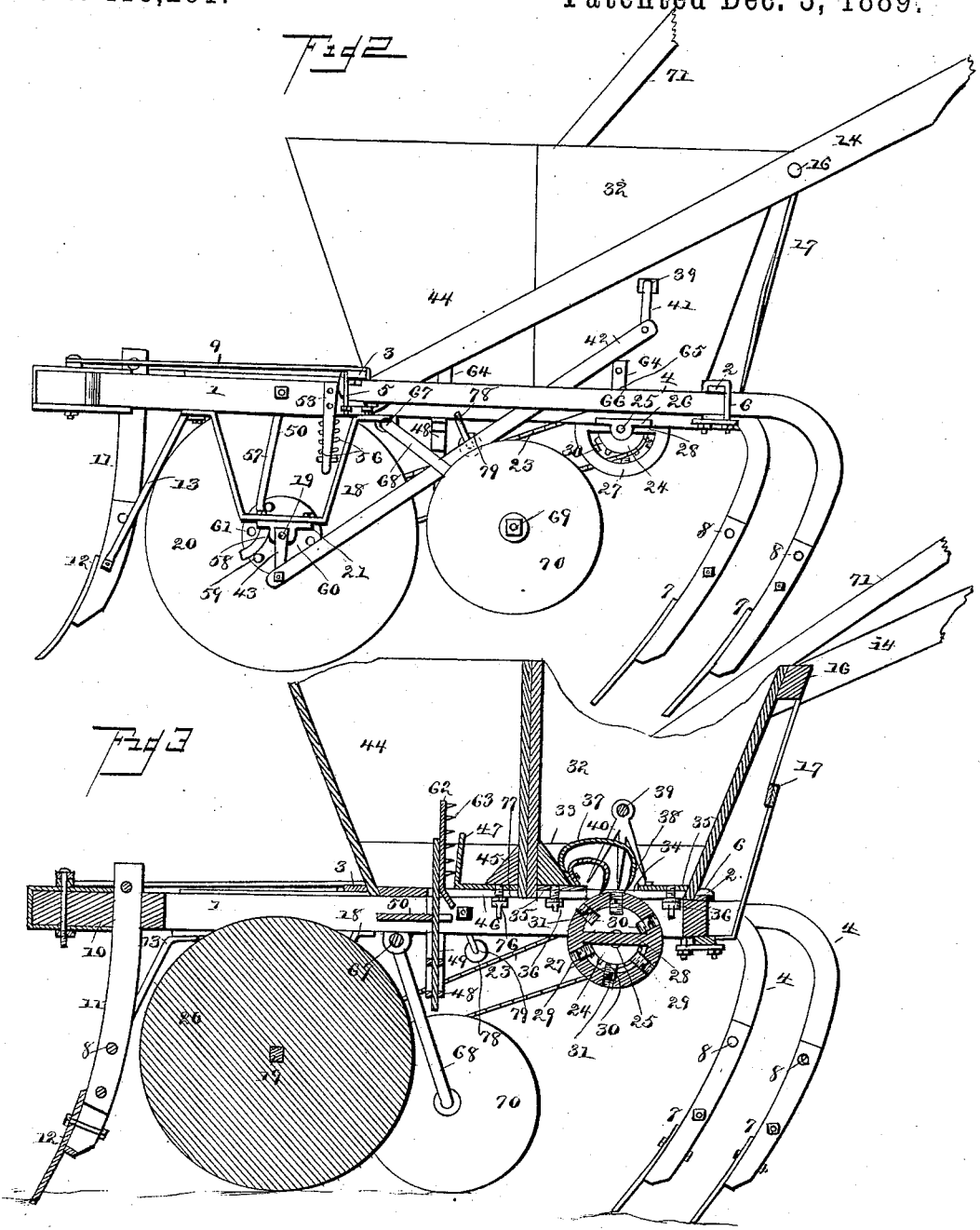
Witnesses
John Smirie
Wm. Bagger
Inventor
George W. Ferrer
By his Attorneys,
C. A. Snow & Co.

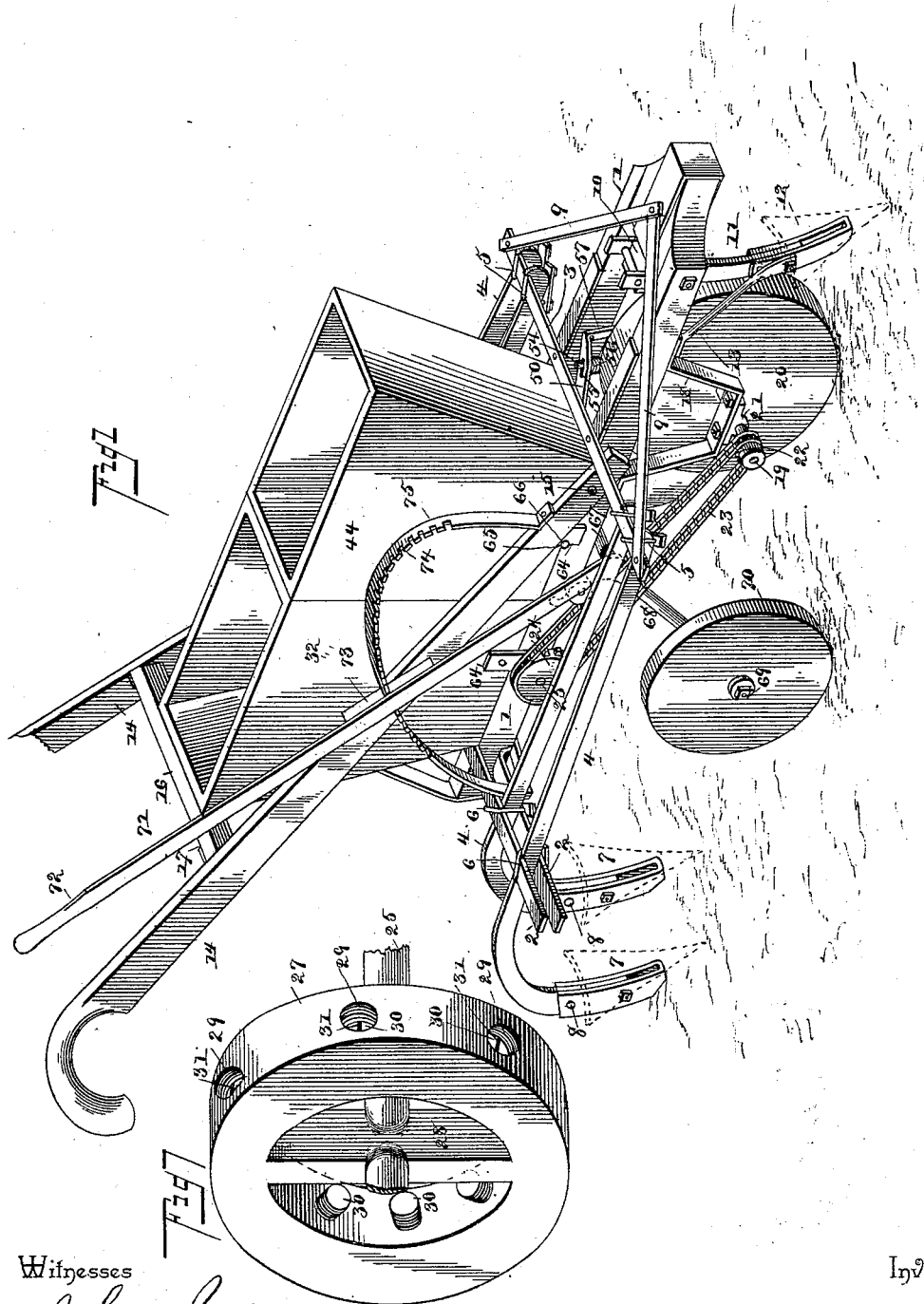

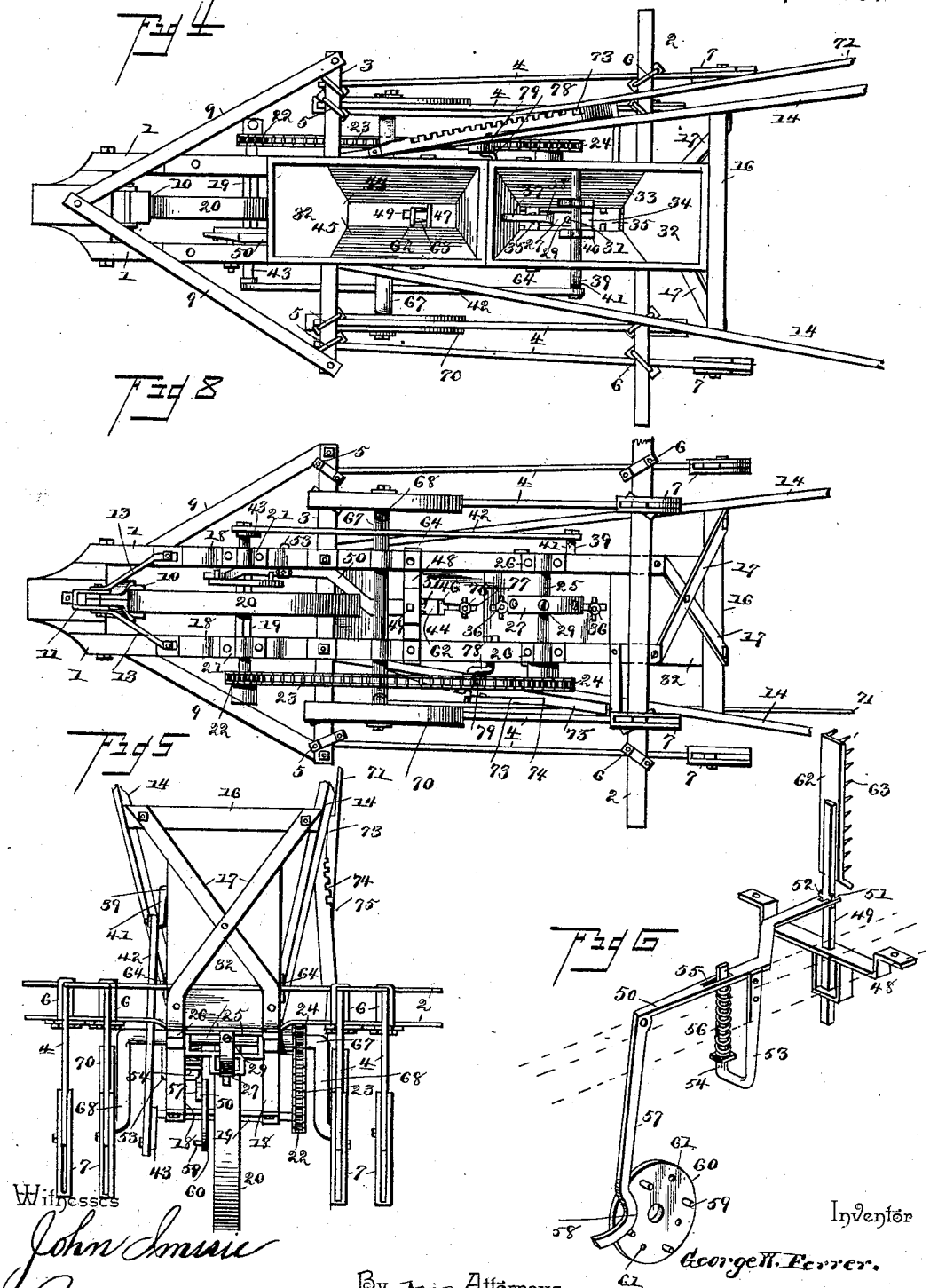

UNITED STATES PATENT OFFICE.

GEORGE W. FERRER, OF MELVIN, ALABAMA.

COMBINED SEED-PLANTER AND FERTILIZER-DISTRIBUTER.

SPECIFICATION forming part of Letters Patent No. 416,291, dated December 3, 1889.

Application filed June 8, 1889. Serial No. 313,585. (No model.)

*To all whom it may concern:*

Be it known that I, GEORGE W. FERRER, a citizen of the United States, residing at Melvin, in the county of Choctaw and State of Alabama, have invented a new and useful Combined Seed-Planter, Fertilizer-Distributer, and Cultivator, of which the following is a specification.

This invention relates to a farm implement comprising a combined seed-planter, fertilizer-distributer, and cultivator; and it has for its object to construct a machine which shall be simple, easily operated, and which may be adjusted so as to regulate the depth to which the plows or shovels shall be allowed to travel in the ground, and by means of which the quantity of seed and fertilizing material which is dropped at each operation may likewise be conveniently and accurately regulated.

The invention consists in the improved construction, arrangement, and combination of parts, which will be hereinafter fully described, and particularly pointed out in the claims.

In the drawings hereto annexed, Figure 1 is a perspective view of a machine embodying my several improvements. Fig. 2 is a side view of the same. Fig. 3 is a longitudinal sectional view. Fig. 4 is a top plan. Fig. 5 is a rear elevation. Fig. 6 is a perspective detail view of the fertilizer-dropping mechanism and the parts for operating the same. Fig. 7 is a perspective detail view of the seed-wheel. Fig. 8 is a bottom view.

The same numbers refer to the same parts in all the figures.

The frame of my improved machine consists of two longitudinal parallel side beams 11, connected at their rear ends by cross bars or braces 2 2 and at some distance from their front ends by a cross-bar 3, to which the cultivator-beams 4 are secured by means of clips 5. The beams 4 extend rearwardly between the cross-bars 2 2, to which they are secured by means of clips 6, and are thence extended downwardly and are provided with the pivoted shoes or standards 7, which are secured in an upright position by means of the brake-pins 8, which will enable the machine to pass over obstructions without injury to any of its parts. The said pivoted shoes are constructed, preferably, of strap-iron bent into U shape, as shown in the drawings annexed. The said shoes may in this manner be manufactured inexpensively, and they will be found to be more durable and to fit more snugly than when constructed in the usual manner with shanks welded in between their upper ends and adapted to fit in the bifurcated lower ends of the plow beams or standards. The ends of the front cross-bar 3 are connected with the front end of the frame by means of converging braces 9. The block 10, which connects the front ends of the frame-beams, extends rearwardly between the latter and carries the standard 11 of the furrow-opener 12. Said standard is braced to the frame by means of inclined rods 13.

Handles 14 14 are secured to the side bars of the frame by means of bolts 15. Said handles are connected near their rear ends by means of the rung 16, and crossed braces 17 17 connect the said rung with the rear ends of the side beams of the frame, thus retaining the handles securely in position. The side beams of the frame are provided near their front ends with depending brackets 18, having bearings for the transverse shaft or axle 19, carrying the operating and bearing wheel 20. The bearings for the axle are formed by detachable boxes 21, which admit of the operating-wheel being conveniently removed from the machine when desired. One end of the axle is provided with a sprocket-wheel 22, from which a chain 23 runs over a sprocket-wheel 24, mounted upon one end of a shaft 25, which is journaled to the boxes or bearings 26 upon the under sides of the side beams of the frame near the rear end of the latter. The shaft 25, to which motion is thus imparted from the axle of the operating-wheel, carries the seed-wheel 27, which consists of an annular rim or casting connected directly to the shaft 25 or to a hub mounted upon said shaft by means of radial arms or spokes 28. The rim 27, which constitutes the seed-wheel, is provided with a series of equidistant radial perforations 29, which are interiorly screw-threaded, and in which are fitted the screw-threaded plugs 30, the outer ends of which are provided with notches 31 to enable the said plugs to be conveniently adjusted by means of an ordinary screw-driver. It will be seen that by properly adjusting the plugs 30 in the perforations 29 seed-cups of any desired depth and capacity may be conveniently formed in the rim of the seed-wheel. It will also be seen that by so adjusting the plugs 30 as to make their outer ends flush with the rim of the seed-wheel any desired number of the seed-cups may be temporarily dispensed with. Thus, for instance, presuming the seed-wheel to be provided with eight perforations or seed-cups arranged to drop seed in hills twelve inches apart, adjustment may be made enabling the seed to be deposited at any desired distances from one to eight feet apart, while at the same time the quantity of seed dropped at each operation may be easily and accurately gaged by simply adjusting the plugs 30 in the rim of the seed-wheel.

32 designates the seed-hopper, which is mounted upon the frame above the seed-wheel, and which is provided with an inclined bottom 33, by means of which the seed is conveyed directly to the rim or face of the seed-wheel, which projects through a slot or opening 34 in the bottom of said hopper. The size of the slot 34 may be regulated by means of longitudinally-adjustable slides 35, having set-screws 36, by means of which they may be secured in any position to which they may be adjusted. Secured to the front of the hopper are the shanks 37 37, which are curved in a rearward direction and provided with flat elastic blades 38 38, bearing against the rim or face of the seed-wheel and forming cut-offs, which serve the double purpose of assisting the seed to find its way into the seed-cup and of removing superfluous seed from the latter.

39 is a shaft mounted transversely in the hopper 32, and provided with radial arms or agitators 40, which serve to stir the seed and prevent it from becoming clogged in the hopper. One end of the shaft 39, which projects through the side of the hopper, is provided with a crank 41, which is connected by means of a pitman 42 with a crank 43, formed upon the ends of the main shaft or axle 19 of the machine. It will thus be seen that while motion is transmitted from the axle to the seed-wheel through the medium of the sprocket-wheels 22 24 and the chain 23 motion is simultaneously transmitted from said axle to the agitator 40 by means of the pitman 42, thus completing the seeding mechanism.

Suitably mounted upon the frame in front of the hopper 32 is a similar hopper 44, adapted to contain fertilizing material and having an inclined bottom 45, serving to convey the contents of said hopper to a slot 46 in the bottom of the latter.

47 designates a spring secured to the bottom of the hopper directly in the rear of the slot 46, over which it extends slightly, being curved from thence in an upward direction.

48 designates a bracket secured transversely under the frame directly below the hopper 44 and provided with bearings for a vertically-sliding rod 49.

50 designates a bell-crank lever pivoted to the inner side of one of the side beams of the frame and provided at the rear end of its horizontal arm with a notch 51, engaging the vertically-sliding rod 49, which is provided with shoulders 52 to engage the notch of the said bell-crank lever. A bracket 53, secured to one of the side beams of the frame, is provided with an upwardly-extending arm 54, extending through a slot 55 in the horizontal arm of the bell-crank lever.

56 is a spring coiled upon the arm 54 and bearing against the under side of the horizontal arm of the bell-crank lever, which is thereby forced in an upward direction, carrying with it the vertically-sliding rod 49 and the attachments of the latter, which will be presently more fully described. The lower end of the vertical arm 57 of the bell-crank lever 50 is bent, so as to form a cam 58, adapted to engage a series of studs 59, extending laterally from a wheel or disk 60, which is mounted rigidly upon the axle 19 of the machine. The disk 60 may be provided with any desired number of perforations 61, located any suitable distance apart to admit of proper adjustment of the pins or studs 59, thereby enabling the operation of the bell-crank lever 50 and the parts actuated thereby to be conveniently regulated.

Suitably secured to the upper end of the vertically-sliding rod 49 is a plate 62, which extends through the slot 46 in the bottom of the hopper 44, and which is provided with a series of rearwardly-extending teeth 63, bearing against the face of the spring 47, which is mounted, as described, at the rear end of the slot 46 in the bottom of the fertilizer-rod. It will be observed that the spring 47 affords a surface against which the teeth of the vertically-sliding plate or feeder 62 may bear freely without danger of being caught, and that at the same time a vibrating motion will be imparted to the spring 47, which serves to agitate the contents of the fertilizer-hopper and to convey it to the slot or discharge-opening in the bottom of the latter.

The operation of the fertilizer-dropping mechanism will be readily understood. When the machine progresses over the field, the laterally-extending spurs 59 of the disk 60 upon the axle 19 will engage the cam 58 at the lower end of the vertical arm of the bell-crank lever 50, thus lowering the horizontal arm of said lever against the tension of the spring 56 and lowering the vertically-sliding rod 49, with the toothed plate 62, the teeth of which serve to discharge a portion of the contents of the hopper through the slot 46. When the cam 58 is released from contact with one of the studs 59, the tension of spring 56 forces the horizontal arm of the bell-crank lever and the vertically-sliding rod 49, with its attachments, in an upward direction, thus restoring the fertilizer-dropping mechanism into position for a repetition of the operation.

The hoppers 32 and 44 are preferably mounted detachably upon the frame of the machine by means of pivoted latch-plates 64, having notches 65, adapted to engage studs 66, extending laterally from the frame, to which the said hoppers may thus be secured in such a manner that they may be quickly and conveniently detached whenever desired.

67 designates a shaft mounted transversely in suitable bearings under the frame, in rear of the operating-wheel 20, and provided with crank-arm 68, the outer ends of which are provided with spindles 69, upon which supporting-wheels 70 are mounted. The shaft or axle 67 is provided at one end with an operating-lever 71, the rear end of which has a handle 72, and which is provided with laterally-extending lug 73, which is adapted to engage any one of a series of notches 74 in a segment-bar 75, which is suitably secured to the frame of the machine. It will be observed that by operating the lever 71 the supporting-wheels 70 may be raised or lowered, thus lowering or elevating the frame of the machine and its attachments as occasion may require. It will also be observed that the supporting-wheels may be secured firmly at any desired adjustment, thereby enabling said supporting-wheels to act in the capacity of a gage, by means of which the depth to which the plows shall be allowed to enter the ground may be accurately regulated.

The position of the spring 47 in the bottom of the hopper 44 may be regulated and adjusted longitudinally by means of a set-screw 76, carrying the said spring and moving longitudinally in a slot 77 in the bottom of the said hopper.

Secured pivotally to one side of the frame is a crank 78, carrying a friction-roller 79, adapted to bear against the chain 23, the tension of which may thus be regulated.

From the foregoing description, taken in connection with the drawings hereto annexed, the operation and advantages of my invention will be readily understood.

The construction of the machine is simple and inexpensive, and it is exceedingly light and durable.

When the machine is to be used as a cultivator, the operating-wheel 20 and its attachments, as well as the standard carrying the furrow-opener, and, if desired, the hoppers, are to be removed from the frame of the machine. The supporting-wheels, however, are permitted to remain, inasmuch as by means thereof the depth to which the plows are permitted to enter the soil may be gaged.

The seeding mechanism and the fertilizer-dropping mechanism may be used either simultaneous or independently, and the quantities of seed and fertilizing material dropped at each operation, as well as the distance between the operations, may be accurately regulated in the manner described.

The entire construction of the machine is simple, and it may be easily operated by one man.

Having thus described my invention, what I claim, and desire to secure by Letters Patent, is—

1. The combination of the hopper, the revolving seed-wheel having radial recesses or seed-cups in its rim or face, and two flat springs secured to the front of the hopper and curved rearwardly and downwardly, the ends of said springs being arranged in contact with the rim of the seed-wheel some distance apart, substantially as set forth.

2. The combination of the frame, the transverse shaft carrying a seed-wheel the rim or face of which is provided with a series of seed-cups, the seed-hopper the bottom of which is provided with a slot and with adjusting-slides, the curved arms or springs secured in the hopper and terminating in flat blades bearing against the rim or face of the seed-wheel, a shaft mounted transversely in the sides of the seed-hopper and provided with radially-extending arms or agitators, and mechanism for simultaneously operating the seed-wheel and the agitator-shaft, substantially as described.

3. The combination, with the frame carrying the fertilizer-hopper, of the dropping mechanism comprising a vertically-movable slide or feeder, a bell-crank lever the horizontal arm of which is provided with a notch engaging projecting shoulders upon the said vertical slides, a cam upon the lower end of the vertical arm of said bell-crank lever, a disk mounted upon the main shaft or axle of the machine and having laterally-extending adjustable pins or studs adapted to engage the said cam, and a spring arranged to force the horizontal arm of the bell-crank lever in an upward direction, substantially as set forth.

4. The combination, with the frame carrying the fertilizer-hopper the bottom of which is provided with a slot or discharge-opening, of an upwardly-extending spring mounted at the rear end of said slot and a bracket secured under the hopper and having bearings for a vertically-sliding plate, said sliding plate having rearwardly-extending teeth that bear against the said spring, substantially as set forth.

5. The combination, with the fertilizer-hopper the bottom of which is provided with a slot or discharge-opening, of a longitudinally-adjustable upwardly-extending flat spring at the rear end of said discharge-opening, a vertically-sliding plate or feeder having rearwardly-extending teeth that bear against said spring, and suitable operating mechanism, substantially as and for the purpose set forth.

6. The combination, with the fertilizer-hopper the bottom of which is provided with a slot or discharge-opening, of a longitudinally-adjustable upwardly-extending flat spring at the rear end of said discharge-opening, a plate or feeder mounted upon a vertically-sliding rod and having rearwardly-extending teeth bearing against the said spring, and a bell-crank lever having a notch engaging shoulders upon the said vertically-sliding rod, said bell-crank lever being provided with a cam engaging pins or studs extending laterally from a wheel or disk upon the main shaft or axle of the machine, substantially as and for the purpose herein set forth.

7. The combination of the fertilizer-hopper, the vertically-sliding plate or feeder extending through the discharge-opening in the bottom of said hopper and having teeth that bear against the face of a spring mounted adjustably in the bottom of said hopper, the bell-crank lever arranged, as described, to operate the said vertically-sliding plate, a bracket attached to the frame of the machine and having a vertical arm extending through a slot in the horizontal arm of the bell-crank lever, and a spring coiled upon the said vertical arm and bearing against the under side of the horizontal arm of the bell-crank lever, substantially as set forth.

In testimony that I claim the foregoing as my own I have hereto affixed my signature in presence of two witnesses.

GEORGE W. FERRER.

Witnesses:
D. C. SAVIN,
R. P. ROOCH.